(12) United States Patent
Peer et al.

(10) Patent No.: US 10,589,449 B2
(45) Date of Patent: Mar. 17, 2020

(54) STATOR INJECTION MOLDING CENTRALIZATION

(71) Applicant: Halliburton Energy Services, Inc., Houston, TX (US)

(72) Inventors: Richard David Peer, Katy, TX (US); Byong Jun Kim, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 15/741,695

(22) PCT Filed: Aug. 14, 2015

(86) PCT No.: PCT/US2015/045225
§ 371 (c)(1),
(2) Date: Jan. 3, 2018

(87) PCT Pub. No.: WO2017/030526
PCT Pub. Date: Feb. 23, 2017

(65) Prior Publication Data
US 2018/0200936 A1     Jul. 19, 2018

(51) Int. Cl.
*B29C 45/36*     (2006.01)
*B29C 45/56*     (2006.01)
(Continued)

(52) U.S. Cl.
CPC .......... *B29C 45/36* (2013.01); *B29C 45/1657* (2013.01); *B29C 45/34* (2013.01);
(Continued)

(58) Field of Classification Search
CPC .................................................... B29C 31/00
See application file for complete search history.

(56) References Cited

U.S. PATENT DOCUMENTS 6,170,572 B1 * 1/2001 Fulbright .............. B29C 33/304
166/105
8,333,244 B2 12/2012 Johnson et al.
(Continued)

FOREIGN PATENT DOCUMENTS

WO    WO 2014/014442 A1    1/2014

OTHER PUBLICATIONS

International Search Report and the Written Opinion of the International Search Authority, or the Declaration, dated Feb. 23, 2016, PCT/US2015/045225, 11 pages, ISA/KR.

*Primary Examiner* — William D Hutton, Jr.
*Assistant Examiner* — Avi T Skaist
(74) *Attorney, Agent, or Firm* — Haynes and Boone, LLP

(57) ABSTRACT

In a stator injection molding centralization technique, a mold core is disposed inside a stator tube, thereby forming an annulus between the stator tube and mold core. The mold core includes a pitch length defined between a first and second lobe tip of the mold core. A centralizing member is positioned in the annulus, which has a length at least as long as the pitch length of the mold core. During the injection molding process, elastomeric material is injected into the annulus behind the centralizing member, which is located adjacent to the injection point. As the elastomer is injected, it displaces the centralizing member ahead of it along the annulus. As the centralizing member moves through the annulus, it supports the mold core, thus preventing the sag effect.

14 Claims, 4 Drawing Sheets

(51) Int. Cl.
| | |
|---|---|
| *F04C 2/107* | (2006.01) |
| *E21B 4/02* | (2006.01) |
| *B29C 45/16* | (2006.01) |
| *B29C 45/34* | (2006.01) |
| *B29C 45/40* | (2006.01) |
| *E21B 43/12* | (2006.01) |
| *F04C 13/00* | (2006.01) |
| *B29K 21/00* | (2006.01) |
| *B29L 31/00* | (2006.01) |

(52) U.S. Cl.
CPC ............ *B29C 45/40* (2013.01); *B29C 45/56* (2013.01); *E21B 4/02* (2013.01); *E21B 43/126* (2013.01); *F04C 2/1071* (2013.01); *F04C 2/1075* (2013.01); *B29C 2045/1664* (2013.01); *B29C 2045/5695* (2013.01); *B29K 2021/00* (2013.01); *B29L 2031/7496* (2013.01); *F04C 13/008* (2013.01); *F04C 2230/21* (2013.01); *F04C 2230/603* (2013.01); *F04C 2240/10* (2013.01)

(56) References Cited

U.S. PATENT DOCUMENTS

| | | | |
|---|---|---|---|
| 2004/0089480 | A1 | 5/2004 | Dewey |
| 2005/0285305 | A1* | 12/2005 | Neuroth ............. B29C 45/5605 264/272.2 |
| 2008/0000083 | A1* | 1/2008 | Wood ................... E21B 4/02 29/889.22 |
| 2012/0132470 | A1 | 5/2012 | Jarvis et al. |
| 2012/0134861 | A1* | 5/2012 | Akbari ................ B29C 45/1459 418/48 |
| 2014/0060936 | A1 | 3/2014 | Connell et al. |
| 2015/0078947 | A1* | 3/2015 | Perez ................. E21B 4/02 418/168 |

\* cited by examiner

STATOR INJECTION MOLDING CENTRALIZATION

PRIORITY

The present application is a U.S. National Stage patent application of International Patent Application No. PCT/US2015/045225, filed on Aug. 14, 2015, the benefit of which is claimed and the disclosure of which is incorporated herein by reference in its entirety.

FIELD OF THE DISCLOSURE

The present disclosure relates generally to the field of injection molding, and more specifically, to injection molding operations for equipment utilized in downhole environments.

BACKGROUND

Wellbore equipment sometimes depends on injection molding processes during manufacture. For example, a progressive cavity pump includes a stator tube with an elastomer material on the interior surface thereof. During operation, a rotor disposed at least in part inside the stator tube operates in conjunction with the stator to pump fluids down a wellbore and transfer pressure or drilling materials downhole. Injection molding processes are typically utilized to cast the elastomer material inside the stator tube.

Injection molding usually requires a mold core that occupies a volume inside the stator tube so the occupied volume does not fill with elastomer material during the injection process. With respect to a progressive cavity pump, this volume may be part of the space where the rotor will operate. Operating conditions, such as elastomer pressure, elastomer temperature, uneven flow of elastomer into a helical space, mold core thermal expansion, and/or mold core weight and length, may cause the mold core to displace downward throughout the injection molding process, a phenomenon sometimes referred to as "sagging." Sagging is also affected by the tendency of elastomer to fill the bottom portions of an annular passageway before the upper portions (when injecting horizontally), thereby causing the elastomer to travel at irregular rates along the outer circumference of the mold core. If the mold core sags, it may cause operational inefficiencies for the completed pump, based on irregularities in clearance between the rotor and the stator and/or other factors.

There are some known attempts to remedy the effects of mold core sag throughout the injection molding process. One example includes drilling pins through the stator tube to hold the mold core in place at various points along the mold core's axial length. However, this pin method still allows sag because there are unsupported points along the mold core. The pin method also increases operational complexity and costs by adding a step to fill the pin holes in the stator tube after injection molding.

DESCRIPTION OF ILLUSTRATIVE EMBODIMENTS

Illustrative embodiments and related methods of the present disclosure are described below as they might be employed to centralize mold cores inside a stator tube during injection molding operations. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure employ stator injection molding centralization techniques. In a generalized method, a mold core is disposed inside a stator tube, thereby forming an annulus between the stator tube and mold core. The mold core includes a pitch length defined between a first and second lobe tip of the mold core. A centralizing member is positioned in the annulus, which has a length at least as long as the pitch length of the mold core. During the injection molding process, elastomeric material is injected into the annulus behind the centralizing member, which is located adjacent to the injection point. As the elastomer is injected, it displaces the centralizing member ahead of it along the annulus. As the centralizing member moves through the annulus, it supports the mold core, thus reducing and/or eliminating sag and its effects on the stator elastomer.

Figure 1:
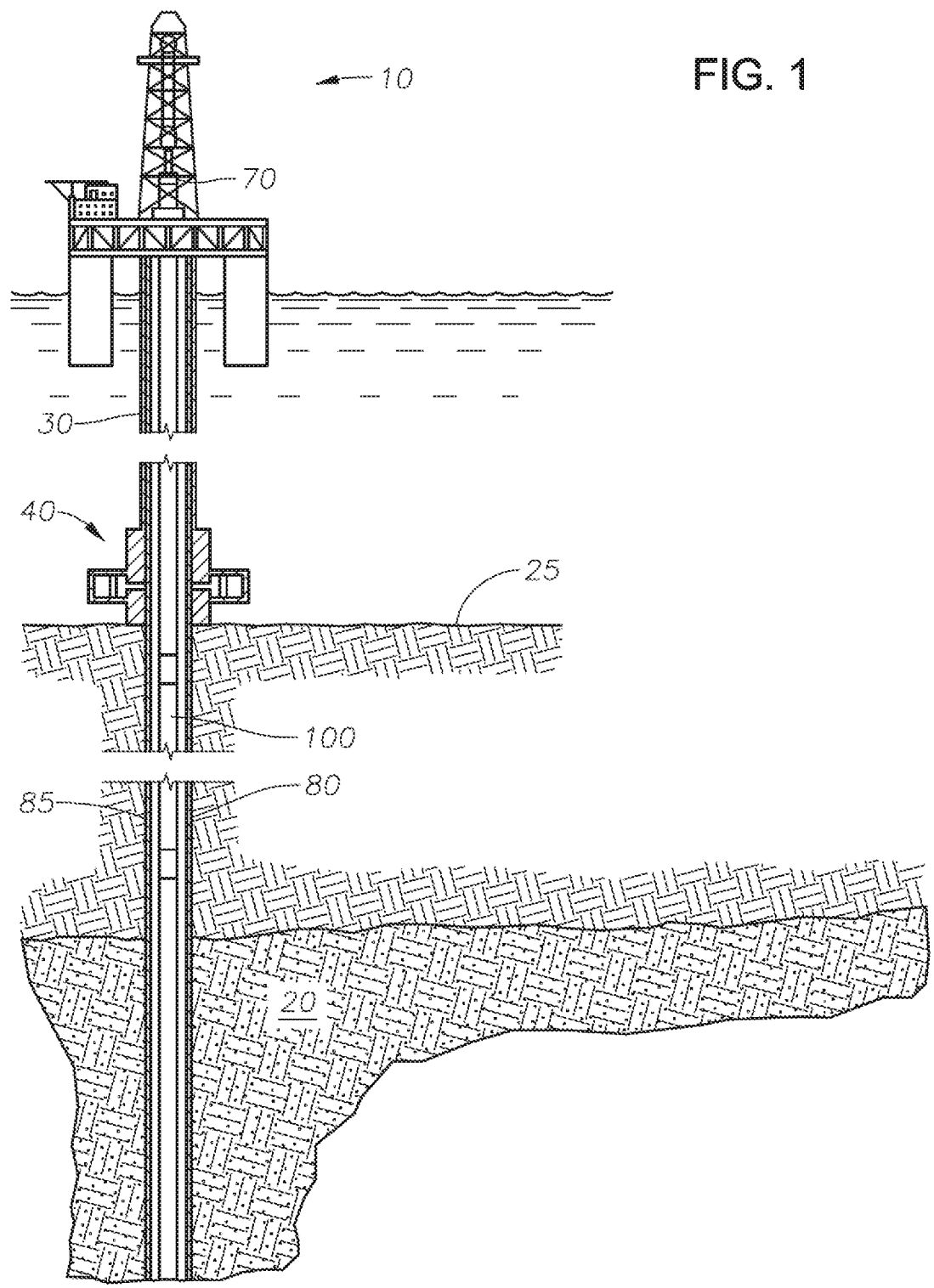
FIG. 1 is a schematic view illustrating a well system operation which may be utilized in accordance with various aspects of the present disclosure.

FIG. 1 is a schematic view illustrating a well system operation which may be utilized in accordance with various aspects of the present disclosure. A floating rig 10 is positioned above a deep water riser 30 that extends down into a wellbore 80. A blow out preventer 40 is positioned at the sea floor 25 to prevent blow outs, as understood in the art. The wellbore 80 has been drilled and cased with casing 85 down through a hydrocarbon formation 20. A stator tube 100 with elastomer material (not shown) disposed therein may then be deployed in wellbore 80, along a completions tool, or otherwise along a downhole tool. In the embodiment shown, stator tube 100 contains a rotor (not shown) and elastomer therein and works in conjunction with a pump 70 to form a progressive cavity pump. Operational considerations may make it desirable for a mold core, used to fabricate stator tube 100 during injection molding processes, to be similar to rotor in terms of size and dimensions. Although FIG. 1 illustrates an offshore well system, it is important to note that the various aspects and embodiments of the present disclosure may equally be utilized in an onshore well system.

Figure 2:
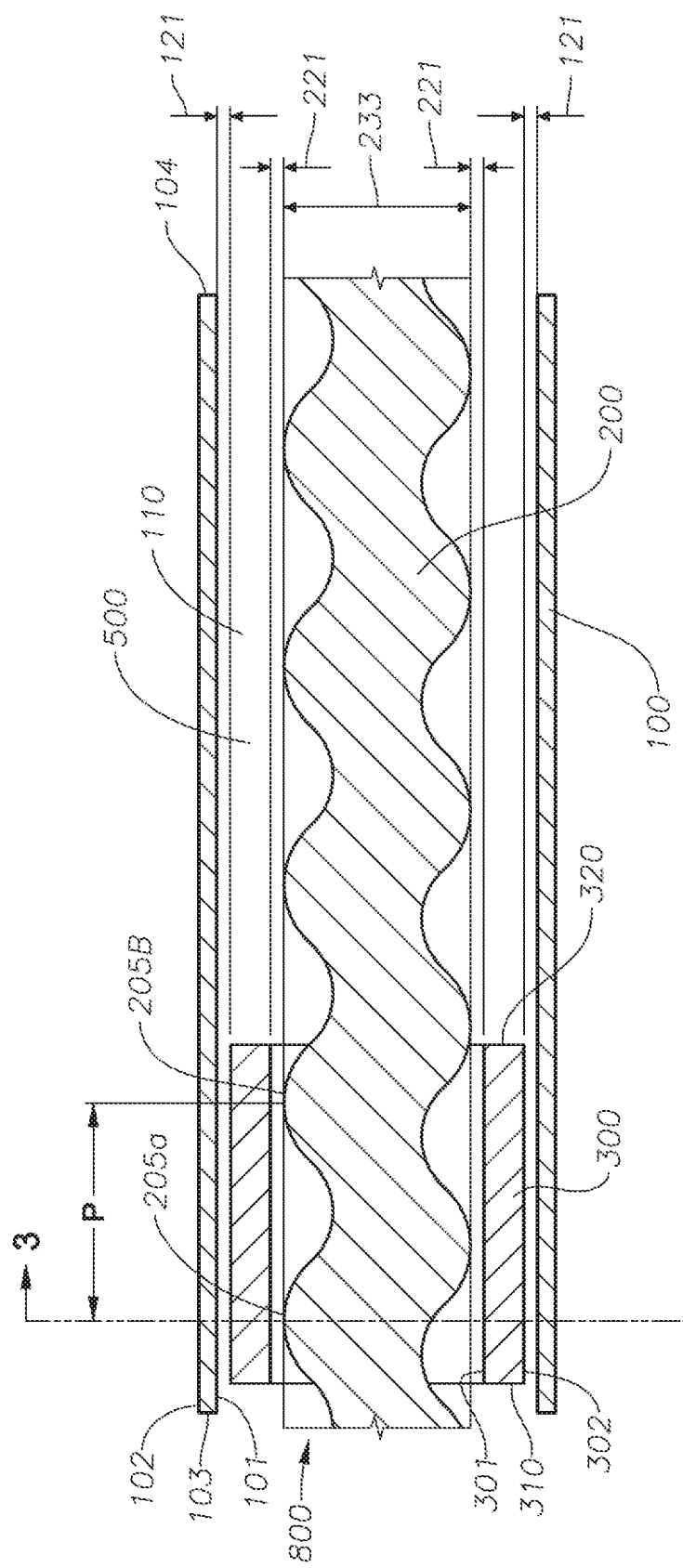
FIG. 2 is a sectional view illustrating an injection molding process that may be utilized in accordance embodiments of the present disclosure.

FIG. 2 is a sectional view of a stator tube during an injection molding process that may be utilized in accordance with the centralizing members of the present disclosure. A mold core 200 is disposed inside an axially-extending passageway 110 of stator tube 100, thereby defining an annular passageway 500 between mold core 200 and stator tube 100.

Mold core 200 defines a major diameter 233 and includes an inner tolerance 221 that extends outward radially from the mold core. Stator tube 100 includes an inner diameter/face 101, an outer diameter/face 102, a first end 103, and a second end 104. Stator tube 100 further includes an outer tolerance 121 that extends radially inward from inner face 101 of stator tube 100. In certain illustrative embodiments, tolerances 121,221 may be 1-10% of annular passageway 500, depending upon the size of the stator. In general, the centralizing member should slide forward without too much friction in the annular passageway space with an acceptable clearance between the lobe face of the mold core and the inner face of the stator tube.

Referring still to FIG. 2, a centralizing member 300 is disposed in annular passageway 500. Centralizing member 300 includes a first end 310, a second end 320, an inner face 301, and an outer face 302. The first end 310 and second end 320 define a centralizer length. In this embodiment, centralizing member 300 is designed and disposed in annular passageway 500 so that at least part of its outer face 302 is within outer tolerance 121 and at least part of its inner face 301 is within inner tolerance 221. In the embodiment shown, centralizing member 300 is disposed near an injection point 800 at which material, such as, for example, elastomer, may be injected into axially-extending passageway 110 to begin the injection molding process. Elastomer material is injected at sufficient operating conditions, such as temperature and pressure, that centralizing member 300 can move along annulus 500 with ease.

Inner face 101 of stator tube 100 may be coated with a material, such as, for example, a bonding agent before the injection molding process begins. As elastomer material is injected, it fills axially-extending passageway 110 around mold core 200 and begins to displace centralizing member 300 along the axial length of mold core 200. In the embodiment shown, centralizing member 300 is disposed near first end 103 of stator tube 100 and may be translated/displaced to a desired point along stator tube 100, such as a point near second end 104. Centralizing member 300 may be removed from stator tube 100 after injection molding concludes. In the embodiment shown, centralizing member 300 is tubular, or in other words, is a tube having a length equal to or greater than the pitch length P of mold core 200. In this embodiment, pitch length P is defined as the length between first and second lobe tips 205a and 205b (also referred to herein as lobe tips 201-204) of mold core 200.

During injection operations, centralizing member 300 supports and centralizes mold core 200 throughout travel along its axial length. In certain illustrative embodiments, the length of centralizing member 300 may be selected based at least in part on any of several factors, such as, for example, a material type of the centralizing member, length of the mold core injecting pressure, viscosity of injected elastomer, etc. A longer centralizing member may give better centralization, but increase a sliding friction force while traveling along the stator tube. Thus, in certain examples, the length of the centralizing member is similar toor even shorter than pitch length P. Centralizing member 300 also helps block elastomer from flowing past it, preventing it from reaching unsupported points along mold core 200 and preventing the bottom of axially-extending passageway 110 from filling before the top fills. The centralizing member may not block elastomer entirely from flowing past it because there is still a space between the lobed mold core and un-lobed centralizing member tube. Centralizing member 300 supports the sagged mold core by lifting it up at as it travels along with the injecting elastomer; it also helps create a uniform flow profile of elastomer at each travelling point due to the resulting spatial confinement in annular passageway 500. This spatial confinement prevents the injected elastomer from filling any area prior to the other area throughout the axially-extending passageway 110, which reduces the chance of the dislocation of mold core 200 by irregular elastomer filling and injection pressure during the injection molding process. Therefore, centralizing member 300 prevents unsupported points of mold core 200 from sagging throughout the injection process by supporting each portion of mold core 200 as it is initially contacted by injected elastomer.

In certain illustrative embodiments, centralizing member 300 may be made of a material that will be hard in comparison to mold core 200 to reduce and/or eliminate sagging. In addition, the centralizing member material may be chosen to reduce the friction force imposed by translating along the mold core and stator tube. For example, the material may be treated ferrous, non-ferrous, or non-metallic material, including thermoplastics, thermosets, and their composites, such as Polyether ether keton (PEEK), polyaryletherketone (PAEK), Polytetrafluoroethylene (PTFE or other Teflon), Polyphenylene sulfide (PPS), phenolic resin, polyamides, epoxy resin, etc., or reinforced composites thereof. Centralizing member 300 may also be designed to withstand operating conditions of the injection molding process. For example, in certain embodiments, centralizing member 300 is made of a material that can withstand elastomer injection operating pressure and that has a melting point of at least the elastomer injection operating temperature. Ultimately, the material chosen may have a high hardness to reduce sagging, a low friction coefficient for easy sliding along the annulus, and a high melting point to avoid melting or flowing during the curing process. In certain embodiments, this may also be a metallic material.

Figure 3:
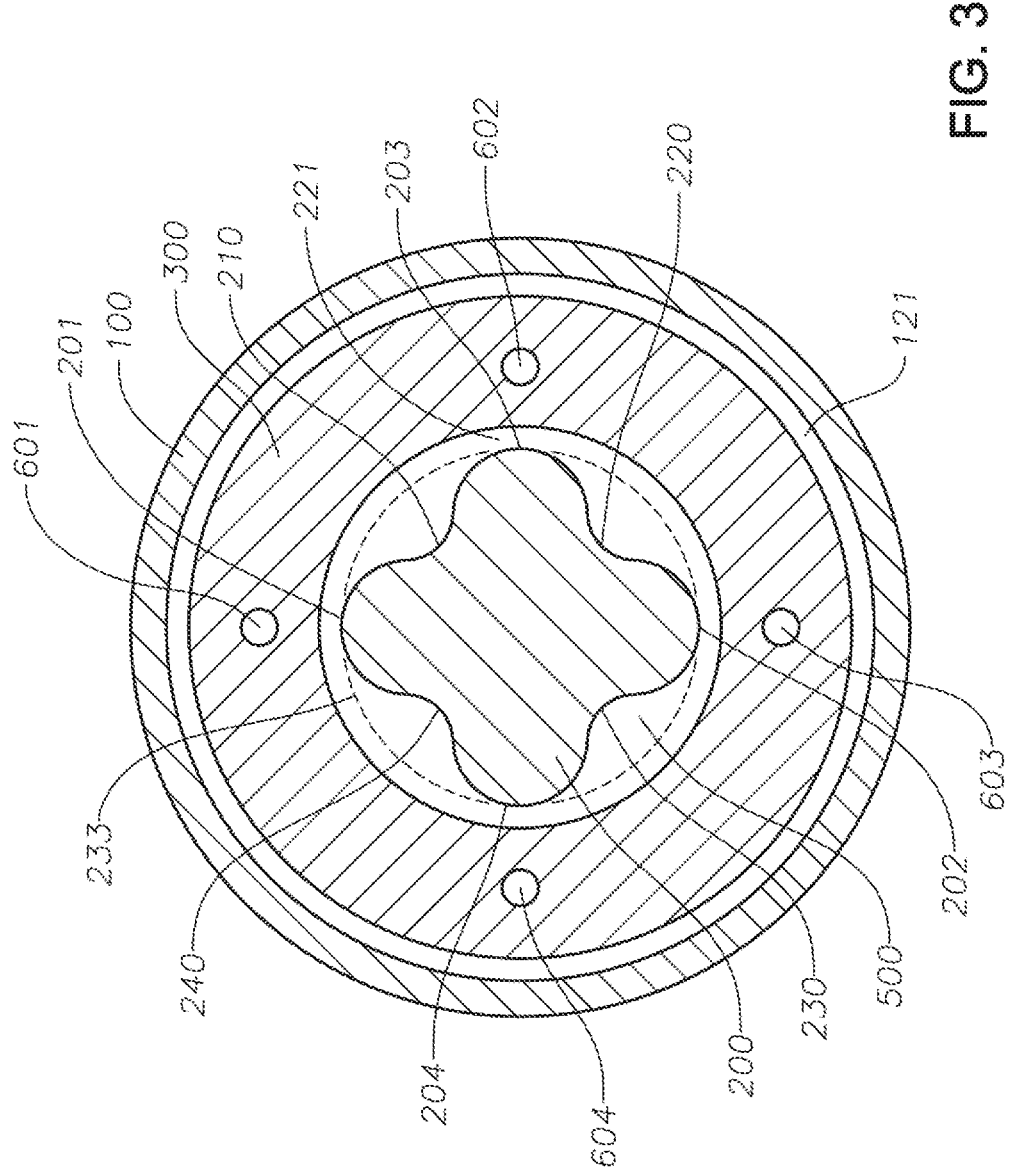
FIG. 3 is a sectional view of line 3-3 in FIG. 2.

FIG. 3 is a sectional view of line 3-3 in FIG. 2. As shown, mold core 200 is disposed at least partially within axially-extending passageway 110 of stator tube 100. Thus, as previously described, mold core 200 and stator tube 100 define annular passageway 500. Mold core 200 defines a major diameter 233 as previously described. Mold core 200 further includes four lobes and a first lobe tip 201, a second lobe tip 202, a third lobe tip 203, and a fourth lobe tip 204. Mold core 200 further includes a first lobe root 210, a second lobe root 220, a third lobe root 230, and a fourth lobe root 240 positioned between the tips. Although the illustrated embodiment includes four lobes, it may include more or less lobes defining a variety of lobe tips and lobe roots in alternate embodiments. Outer tolerance 121 extends inward radially from inner face 101 of stator tube 100. Inner tolerance 221 extends outward radially from mold core 200. More specifically, the particular embodiment illustrated includes inner tolerance 221 extending outward radially from lobe tips 201-204. The tolerances may provide for a small clearance so that the centralizing member remains positioned securely within the annulus in order to prevent sagging. Centralizing member 300 is positioned within annulus 500, as previously described, in order to conduct the injection molding operations described herein.

In the illustrative embodiments described herein, sagging of mold core 200 throughout the injection molding process may be reduced by supporting and centralizing mold core 200 at one or more lobe tips 201-204 rather than lobe roots 210-240. Supporting mold core 200 at lobe tips 210-240 rather than lobe roots 210-240 also reduces variance in tolerances throughout stator tube 100, if such tolerances are utilized. These features allow for centralizing member 300 to be disposed so that its outer diameter is disposed within outer tolerance 121 and its inner diameter is disposed within inner tolerance 221.

Still referring to FIGS. 2-3, since centralizing member 300 is designed within tolerances 121 and 221, such aspects of centralizing member 300 also block a substantial portion of annular passageway 500 and thereby help reduce any tendency for elastomer material to flow past centralizing member 300 and contact unsupported points along mold core 200. Therefore, centralizing member 300 supports and reduces the sagging of points along mold core 200 and does so without requiring drilling of holes into stator tube 100. Blocking a substantial portion of annular passageway 500 also prevents the tendency of elastomer material to fill the bottom of the axially-extending passageway 110 and thereby assists the elastomer to fill the entire desired geometrical cross-section of axially-extending passageway 110 at a constant rate along the axial length of mold core 200. In addition, filling at a constant rate also reduces sagging of mold core 200.

Disposing centralizing member 300 around mold core 200 a length of at least the pitch length P removes the need for multiple members disposed in two or more of lobe roots 210-240. Removing the need for multiple lobe root members contacting lobe roots 210-240 reduces operational costs, reduces risk of the multiple members translating at variable rates throughout injection, and reduces the risk of damage to stator tube 100 or mold core 200 arising from the helical motion of the multiple lobe root members.

Referring to FIG. 3, the depicted embodiment of centralizing member 300 may further include a first venting cavity 601, a second venting cavity 602, a third venting cavity 603, and a fourth venting cavity 604. Venting cavities 601-604 may allow fluids (e.g., air or other gases) to vent as elastomer is injected into axially-extending passageway 110, reducing the chance that an axial gap may be developed between elastomer and centralizing member 300. Such a gap would allow unsupported portions of mold core 200 to be exposed to elastomer, thereby increasing the risk of sagging throughout the injection molding process. In some embodiments, the venting cavities 601-604 are disposed equidistantly around the circumferential cross-section of centralizing member 300, thereby ensuring venting cavities 601-604 can function without disrupting the elastomer injection, the translation of centralizing member 300, or the centralizing functions of centralizing member 300. In addition, the venting cavities may be small enough so that the elastomeric material does not flow therethrough. However, in some embodiments, the venting cavities may not be necessary because there is already a sufficient gap for venting between the lobed mold core and the stator tube.

Figure 4:
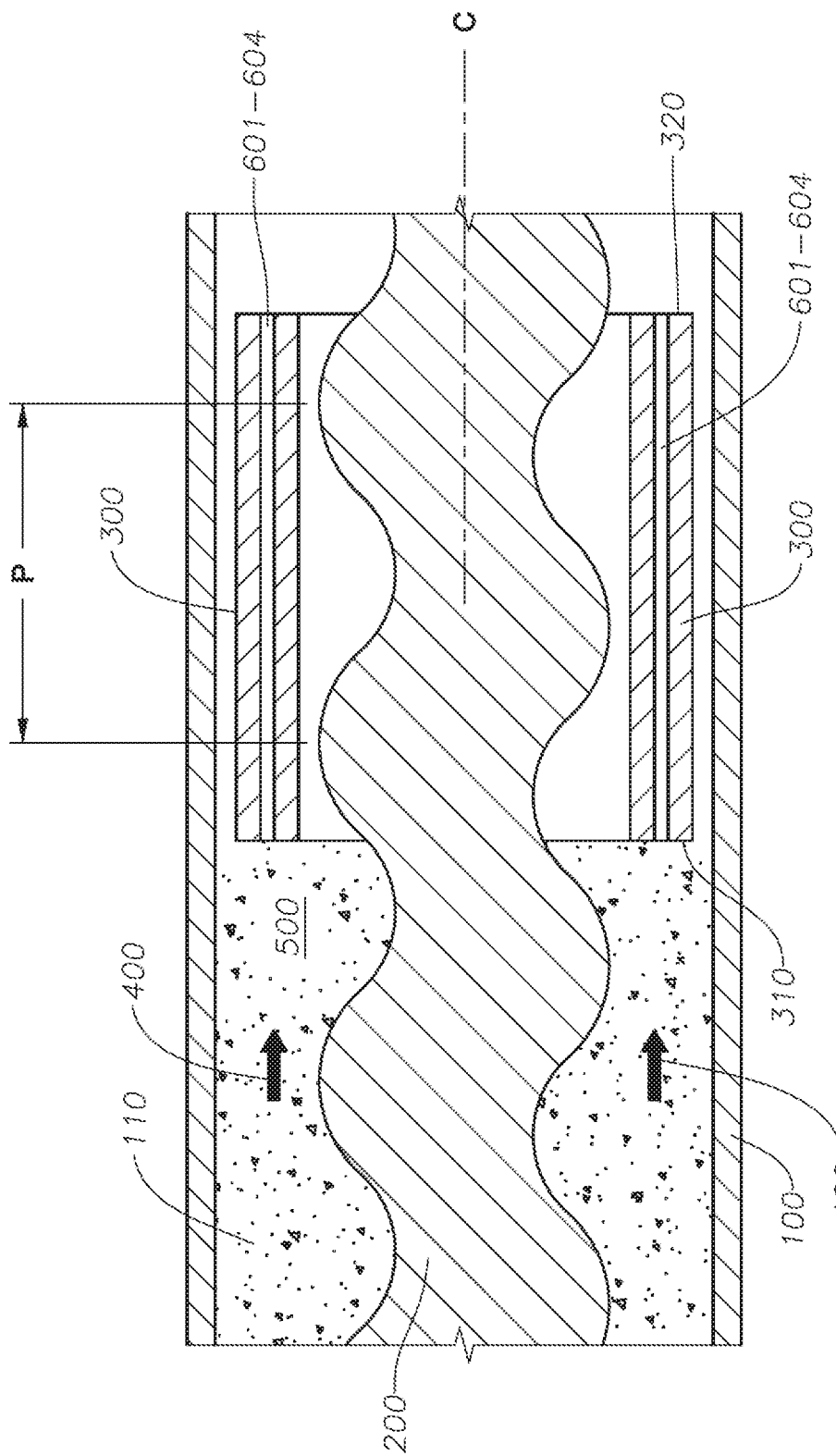
FIG. 4 is a front cross-sectional view illustrating an injection molding process utilizing various centralizing member embodiments of the present disclosure.

FIG. 4 is a sectional view illustrating an injection molding process as the centralizing member is being displaced along the annulus, according to some methods of the present disclosure. Elastomer flow 400 illustrates the direction of elastomer flow from an upstream injection point 800 (FIG. 2) and the direction of centralizing member 300's displacement. Elastomer flow 400 also illustrates the direction that air or other gases can vent through venting cavities 601-604. In certain embodiments, venting cavities 601-604 extend from a first end 310 of centralizing member 300 to a second end 320. Venting cavities 601-604 may be parallel to a centralizing axis C-C of centralizing member 300, as illustrated, but may also have other orientations. Venting cavities 601-604 may be designed to receive an expected volume of air or gases that exists, before injection commences, upstream of centralizing member 300 and downstream of injection point 800. For example, if two cubic feet of air is expected in this volume, then venting cavities 601-604 may be designed to open a void volume of two cubic feet or more in centralizing member 300. Venting cavities 601-604 enhance centralizing capabilities of centralizing member 300 by reducing and/or preventing gaps between the injected elastomer and centralizing member 300.

FIG. 4 also illustrates how centralizing member 300 can support and centralize mold core 200 throughout the injection molding process. As centralizing member 300 translates due to the elastomer contacting it, member 300 supports and centralizes the various portions of mold core 200 while those portions are initially exposed to the injected elastomer. Centralizing member 300 may thereby prevent sag along a desired axial length of mold core 200 during injection molding because the lobe tip points are supported and centralized when they are first contacted by injected elastomer. As a result, centralizing member 300 is able to prevent sag of mold core 200 without requiring the use of holes in stator tube 100 that will require filling after injection molding has concluded.

The embodiment illustrated includes a mold core 200 that is similar in shape to a helical rotor, so lobe tips 201-204 and lobe roots 210-240 (FIG. 3) sweep helically along the axial length of mold core 200. Mold core 200 further includes helically-sweeping lobe cavities defined by lobe tips 201-204 and lobe roots 210-240. The lobes of mold core 200 thereby define a pitch length P, as previously described. First end 310 and second end 320 of centralizing member 300 therefore define the centralizer member length. In the illustrative embodiment, the centralizer member length is about equal to pitch length P, or greater, for the purpose of preventing elastomer from flowing downstream past centralizing member 300 during injection, as well as providing greater support for core 200. This may be desirable because as first end 310 of centralizing member 300 translates and passes a lobe tip, elastomer may enter into a lobe cavity and flow past second end 320 of centralizing member 300. Having a centralizer length greater than pitch length P ensures that second end 320 is contacting a subsequent lobe tip, so elastomer cannot flow past second end 320. These features further assist in preventing the tendency of injected elastomer from filling bottom portions of axially-extending passageway 110 before upper portions, thereby preventing sag of mold core 200 portions upstream of centralizing member 300.

FIG. 4 also illustrates how centralizing member 300 contacts mold core 200 at two or more of lobe tips 201-204, rather than lobe roots 210-240. Contacting centralizing member 300 at two or more of lobe tips 201-204 allows for a tubular centralizing member 300 that displaces axially along mold core 200, rather than helically along lobe roots 210-240. Not only is sag better prevented at lobe tips 201-204 than lobe roots 210-240, but risk of damage to mold core 200 or stator tube 100 is also reduced by the elimination of contact between centralizing member 300 and lobe roots 210-240. Risk of damage is further reduced by displacing centralizing member 300 axially, rather than helically. Moreover, an integral and/or tubular centralizing member 300 reduces costs and ensures that elastomer translates through cross-sectional portions of axially-extending passageway 110 at an equal rate.

In view of the foregoing, an illustrative method of the present disclosure will now be described. First, a stator tube is coated along its inner diameter with a bonding agent. A mold core is then positioned inside the stator tube, thereby forming an annulus between the stator tube and mold core.

One or more venting cavities may be positioned within the mold core. The centralizing member is concentrically disposed around the mold core to contact a first and second lobe tip of the mold core. The first and second lobe tips also define a pitch length of the mold core. The centralizing member is dimensioned so that it is positioned within the necessary tolerances, as described herein. The centralizing member is positioned adjacent an injection point of the stator tube. Elastomeric material is then injected into the annulus by an injection mechanism. The injection process thereby translates the centralizing member through the annulus ahead of the elastomeric material.

It may be determined whether the centralizing member has translated or reached a desired point along the annulus during the injection molding process. Once the centralizing member reaches this position, the elastomer may be cured, and the centralizing member may be removed from the stator tube. The mold core may then be removed from the stator tube as well. Thereafter, the stator tube may be deployed downhole along a drill string, completions tool, or otherwise in conjunction with a wellbore. The stator tube may be coupled or connected to a prime mover system. For example, the stator tube may be connected to a pump to form a progressive cavity pump for completions tool operations.

The steps above need not be performed in any specific order and some steps may not be performed at all. Furthermore, some steps may be combined or expanded into a certain number of operational steps. For example, the steps of removing the centralizing member and mold core from the stator tube may be performed in a single operational step.

Embodiments of the present disclosure described herein further relate to any one or more of the following paragraphs:

1. A method for centralizing a mold core inside a stator tube, comprising disposing the mold core inside a stator tube, thereby forming an annulus between the mold core and stator tube, wherein a pitch length of the mold core is defined between a first lobe tip and a second lobe tip of the mold core; and positioning a centralizing member adjacent a first end of the stator tube and within the annulus, wherein the centralizing member is concentrically disposed around the mold core to thereby extend at least from the first lobe tip to the second lobe tip.

2. A method as defined in paragraph 1, further comprising injecting elastomer proximate the first end of the stator tube to fill the annulus; and displacing the centralizing member along the stator tube as the annulus is filled with the elastomer.

3. A method as defined in paragraphs 1 or 2, wherein the centralizing member is positioned adjacent an injection point of the elastomer upon initiation of the injection.

4. A method as defined in any of paragraphs 1-3, further comprising venting fluid through a venting cavity positioned along the centralizing member during the injection.

5. A method as defined in any of paragraphs 1-4, further comprising curing the elastomer after injecting it into the stator tube.

6. A method as defined in any of paragraphs 1-5, further comprising removing the mold core from the stator tube.

7. A method as defined in any of paragraphs 1-6, further comprising utilizing the stator tube in a downhole operation.

8. A method as defined in any of paragraphs 1-7, further comprising coating an inner diameter of the stator tube with a bonding agent.

9. An apparatus for centralizing a mold core inside a stator tube, comprising a mold core positioned inside the stator tube, thereby defining an annulus between the stator tube and mold core, wherein the mold core comprises pitch length defined between a first lobe tip and a second lobe tip of the mold core; and a centralizing member positioned in the annulus, wherein the centralizing member is concentrically disposed around the mold core to thereby cover the first and second lobe tips.

10. An apparatus as defined in paragraph 9, wherein the centralizing member extends beyond the pitch length of the mold core.

11. An apparatus as defined in paragraphs 9 or 10, further comprising a mechanism to inject an elastomer within the annulus and thereby translating the centralizing member along a length of the stator tube through the annulus.

12. An apparatus as defined in any of paragraphs 9-11, wherein the centralizing member comprises one or more venting cavities extending there through.

13. An apparatus as defined in any of paragraphs 9-12, wherein the centralizing member is made of a non-metallic material.

14. An apparatus as defined in any of paragraphs 9-13, wherein the centralizing member is made of a metallic material.

15. An apparatus as defined in any of paragraphs 9-14, further comprising a bonding agent along an inner diameter of the stator tube.

16. An apparatus as defined in any of paragraphs 9-15, wherein the stator tube comprises part of a downhole assembly.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for centralizing a mold core inside a stator tube, comprising:
    disposing the mold core inside a stator tube, thereby forming an annulus between the mold core and stator tube, wherein a pitch length of the mold core is defined between a first lobe tip and a second lobe tip of the mold core;
    positioning a centralizing member adjacent a first end of the stator tube and within the annulus, wherein the centralizing member is a tubular concentrically disposed around the mold core to thereby extend at least from the first lobe tip to the second lobe tip;
    injecting elastomer proximate the first end of the stator tube to fill the annulus; and
    displacing the centralizing member along the stator tube as the annulus is filled with the elastomer.

2. The method as defined in claim 1, wherein the centralizing member is positioned adjacent an injection point of the elastomer upon initiation of the injection.

3. The method as defined in claim 1, further comprising venting fluid through a venting cavity positioned along the centralizing member during the injection.

4. The method as defined in claim 3, further comprising curing the elastomer after injecting it into the stator tube.

5. The method as defined in claim 4, further comprising removing the mold core from the stator tube.

6. The method as defined in claim 5, further comprising utilizing the stator tube in a downhole operation.

7. The method as defined in claim 1, further comprising coating an inner diameter of the stator tube with a bonding agent.

8. An apparatus for centralizing a mold core inside a stator tube, comprising:
- a mold core positioned inside the stator tube, thereby defining an annulus between the stator tube and mold core, wherein the mold core comprises pitch length defined between a first lobe tip and a second lobe tip of the mold core;
- a centralizing member positioned in the annulus, wherein the centralizing member is a tubular concentrically disposed around the mold core to thereby cover the first and second lobe tips; and
- a mechanism to inject an elastomer within the annulus and thereby translating the centralizing member along a length of the stator tube through the annulus.

9. The apparatus as defined in claim 8, wherein the centralizing member extends beyond the pitch length of the mold core.

10. The apparatus as defined in claim 8, wherein the centralizing member comprises one or more venting cavities extending there through.

11. The apparatus as defined in claim 8, wherein the centralizing member is made of a non-metallic material.

12. The apparatus as defined in claim 8, wherein the centralizing member is made of a metallic material.

13. The apparatus as defined in claim 8, further comprising a bonding agent along an inner diameter of the stator tube.

14. The apparatus as defined in claim 8, wherein the stator tube comprises part of a downhole assembly.

\* \* \* \* \*